United States Patent
Hayashi

(10) Patent No.: US 10,782,515 B2
(45) Date of Patent: Sep. 22, 2020

(54) MICROSCOPE SYSTEM, OBSERVATION METHOD, AND COMPUTER-READABLE RECORDING MEDIUM

(71) Applicant: OLYMPUS CORPORATION, Hachioji-shi, Tokyo (JP)

(72) Inventor: Takehiko Hayashi, Sagamihara (JP)

(73) Assignee: OLYMPUS CORPORATION, Tokyo (JP)

(*) Notice: Subject to any disclaimer, the term of this patent is extended or adjusted under 35 U.S.C. 154(b) by 157 days.

(21) Appl. No.: 16/168,331

(22) Filed: Oct. 23, 2018

(65) Prior Publication Data

US 2019/0121111 A1     Apr. 25, 2019

(30) Foreign Application Priority Data

Oct. 24, 2017    (JP) .................. 2017-205083

(51) Int. Cl.
| | |
|---|---|
| G02B 21/06 | (2006.01) |
| G02B 21/04 | (2006.01) |
| G02B 21/16 | (2006.01) |
| G02B 21/24 | (2006.01) |
| G02B 21/34 | (2006.01) |
| G02B 21/26 | (2006.01) |
| G02B 21/33 | (2006.01) |
| G02B 21/00 | (2006.01) |

(52) U.S. Cl.
CPC .......... *G02B 21/06* (2013.01); *G02B 21/04* (2013.01); *G02B 21/16* (2013.01); *G02B 21/245* (2013.01); *G02B 21/26* (2013.01); *G02B 21/34* (2013.01)

(58) Field of Classification Search
USPC ....................................... 348/79–80
See application file for complete search history.

(56) References Cited

U.S. PATENT DOCUMENTS

| | | | |
|---|---|---|---|
| 4,769,530 A | 9/1988 | Miyahara | |
| 2001/0050763 A1* | 12/2001 | Shirai | G01S 17/36 356/5.1 |
| 2005/0280892 A1* | 12/2005 | Nagasawa | G02B 21/0032 359/368 |

(Continued)

FOREIGN PATENT DOCUMENTS

| | | |
|---|---|---|
| JP | 62131219 A | 6/1987 |
| JP | H11249027 A | 9/1999 |

*Primary Examiner* — Hung Q Dang
(74) *Attorney, Agent, or Firm* — Holtz, Holtz & Volek PC

(57) ABSTRACT

A microscope system includes: a stage on which an observation sample is mounted; an objective lens; a driving unit configured to drive the stage or the objective lens to change a distance between the stage and the objective lens; a light source configured to selectively irradiate the observation sample with one of autofocus detection light and excitation light; an irradiation region changing unit configured to change a region in which the observation sample is irradiated with light; a first mirror unit; a second mirror unit; a mirror arrangement unit configured to selectively arrange one of the first mirror unit and the second mirror unit on the optical axis; an imaging unit configured to capture the observation sample; a light intensity calculating unit configured to calculate light intensity; and a controller configured to adjust, based on a reference position, a distance between the observation subject and the objective lens.

16 Claims, 14 Drawing Sheets

(56) References Cited

U.S. PATENT DOCUMENTS

| | | | | |
|---|---|---|---|---|
| 2008/0266440 A1* | 10/2008 | Yazdanfar | ............ | G02B 21/244 |
| | | | | 348/340 |
| 2009/0195866 A1* | 8/2009 | Kawaski | .............. | G02B 21/082 |
| | | | | 359/385 |
| 2011/0017902 A1* | 1/2011 | Hing | ...................... | G02B 27/40 |
| | | | | 250/201.2 |
| 2011/0101203 A1* | 5/2011 | Cooper | ................ | G02B 21/245 |
| | | | | 250/201.4 |
| 2012/0038979 A1* | 2/2012 | Hing | ................... | G02B 21/365 |
| | | | | 359/383 |
| 2012/0193511 A1* | 8/2012 | Okabe | ................. | G02B 21/245 |
| | | | | 250/201.2 |
| 2013/0258093 A1* | 10/2013 | Jingu | ................ | G01N 21/9501 |
| | | | | 348/92 |
| 2015/0296126 A1* | 10/2015 | Okugawa | .............. | G02B 21/367 |
| | | | | 348/345 |
| 2016/0216501 A1* | 7/2016 | Cable | .................. | G01B 9/02059 |
| 2017/0184833 A1* | 6/2017 | Okamoto | .............. | G01J 3/0237 |

\* cited by examiner

MICROSCOPE SYSTEM, OBSERVATION METHOD, AND COMPUTER-READABLE RECORDING MEDIUM

CROSS-REFERENCE TO RELATED APPLICATIONS

This application is based upon and claims the benefit of priority from Japanese Patent Application No. 2017-205083, filed on Oct. 24, 2017, the entire contents of which are incorporated herein by reference.

BACKGROUND

The present disclosure relates to a microscope system capable of automatically focusing on an observation sample, an observation method, and a computer-readable recording medium for the same.

In studies conducted in the biological field or examination processes in the industrial field, microscope systems capable of generating observation images of minute samples and displaying or recording still images or moving images are widely used.

When observing a sample by using a microscope system, it is necessary to accurately focus on the observation sample. Furthermore, if similar observation is repeatedly performed in examination processes or the like, in order to reduce examination time, prompt focusing is required.

In a microscope system, an operation of focusing was performed by an operator manually operating a focusing handle included in the microscope system. Specifically, the operator manually operates an operation handle and focuses the position of the focal point of an objective lens on the observation sample. However, the operator needs to be proficient in operation of focusing to some extent. In particular, when focusing on a high-magnification objective lens, because the depth of focus is shallow and an in-focus region is narrow, the operator needs to be considerably proficient. Furthermore, in an operation of manual focusing, a certain period of time is needed for the operation and a burden is accordingly placed on the operator, which causes a decrease in the efficiency of the examination processes.

To solve the problem described above, there is a proposed microscope system capable of automatically focusing. Japanese Laid-open Patent Publication No. 11-249027 discloses a microscope system capable of automatically focusing by using infrared light as a method of automatically detecting a focal point, by using a two segment detector. Japanese Laid-open Patent Publication No. 62-131219 discloses, as a method of automatically detecting a focal point, a microscope system capable of automatically focusing by using an area sensor, such as a position sensitive detector (PSD: optical position sensor).

For example, the technology disclosed in Japanese Laid-open Patent Publication No. 11-249027 has been commercialized as IX3-ZDC2 (https://www.olympus-lifescience-.com/ja/microscopes/inverted/ix83/ix3-zdc2/#!) by Olympus Corporation. The external dimensions of this device are about 250 mm (width)×250 mm (depth)×60 mm (height), and the mass is about 2 kg.

In recent years, electrically driven microscopes called "small sized all-in-one microscopes" or "box type fluorescence microscopes" are widely used and, in general, fluorescence observation can be performed by these microscopes (for example, see https://www.olympus-lifescience.com/ja/microscopes/inverted/fsx100/#!, or https://www.keyence.co.jp/products/microscope/fluorescence-microscope/bz-x700/models/bz-x800/). In response to requests from various kinds of users, although the flexibility of combination is low when compared with a microscope system in which a single microscope is structured by flexibly combining needed units, such as a microscope frame, a stage, a light source, an illumination and imaging unit, and a camera, the above described microscopes have functions needed for a lot of users, and are, furthermore, compact and easy to use, which is attractive and appreciated in the market. Furthermore, a conventionally used eyepiece does not tend to be included and a function of displaying images captured by a camera on a monitor is becoming common in the biological field and the industrial field.

With such box type microscopes, there is a tendency to give priority to devices that are compact in size.

SUMMARY

In some embodiments, a microscope system includes: a stage on which an observation sample is mounted, the observation sample including both a transparent member and an observation subject mounted on the transparent member; an objective lens that allows the observation subject to be observed; a driving unit configured to drive the stage or the objective lens in a direction parallel to an optical axis to change a distance between the stage and the objective lens; a light source configured to selectively irradiate the observation sample with one of autofocus detection light that has a specific wavelength band and excitation light that excites the observation subject; an irradiation region changing unit configured to change a region in which the observation sample is irradiated with light; a first mirror unit that can be inserted on and removed from the optical axis, that reflects, toward the observation sample when the first mirror unit is arranged on the optical axis, at least a part of the autofocus detection light irradiated by the light source, and that passes at least a part of the autofocus detection light reflected by the observation sample; a second mirror unit that can be inserted on and removed from the optical axis, that reflects, toward the observation sample when the second mirror unit is arranged on the optical axis, at least a part of the excitation light irradiated by the light source, and that passes at least a part of fluorescence from the observation subject; a mirror arrangement unit configured to selectively arrange one of the first mirror unit and the second mirror unit on the optical axis; an imaging unit configured to capture the observation sample; a light intensity calculating unit configured to calculate light intensity in a predetermined area in an image of the observation sample captured by the imaging unit; and a controller configured to detect, by controlling the driving unit, a reference position in which the light intensity is the highest and adjust, based on the reference position, a distance between the observation subject and the objective lens in a direction parallel to the optical axis.

In some embodiments, provided is an observation method performed by a microscope system that includes: a first mirror unit that can be inserted on and removed from an optical axis, that reflects, when the first mirror unit is arranged on the optical axis, at least a part of autofocus detection light having a specific wavelength band toward an observation sample that includes both a transparent member and an observation subject mounted on the transparent member, and that passes at least a part of the autofocus detection light reflected by the observation sample; and a second mirror unit that can be inserted on and removed from the optical axis, that reflects, when the second mirror unit is arranged on the optical axis, at least a part of excitation light that excites the observation subject toward the observation sample, and that passes at least a part of fluorescence from the observation subject. The observation method includes: changing a region in which the observation sample is irradiated with light to a first region; arranging the first mirror unit on the optical axis; irradiating the observation sample with the autofocus detection light; capturing the observation sample irradiated with the autofocus detection light; calculating light intensity in a predetermined area in an image that has been obtained by capturing the observation sample; detecting, by driving the stage on which the observation sample is mounted in a direction parallel to the optical axis or by driving an objective lens that allows the observation subject to be observed in a direction parallel to the optical axis, a reference position in which the light intensity is the highest; adjusting, based on the reference position, a distance between the observation subject and the objective lens in the direction parallel to the optical axis; changing the region in which the observation sample is irradiated with light to a second region that is different from the first region; arranging the second mirror unit on the optical axis; irradiating the observation sample with the excitation light; and capturing the observation sample irradiated with the excitation light.

In some embodiments, provided is a non-transitory computer-readable recording medium having stored therein an executable program that causes a microscope system, which includes: a first mirror unit that can be inserted on and removed from an optical axis, that reflects, when the first mirror unit is arranged on the optical axis, at least a part of autofocus detection light having a specific wavelength band toward an observation sample that includes both a transparent member and an observation subject mounted on the transparent member, and that passes at least a part of the autofocus detection light reflected by the observation sample; and a second mirror unit that can be inserted on and removed from the optical axis, that reflects, when the second mirror unit is arranged on the optical axis, at least a part of excitation light that excites the observation subject toward the observation sample, and that passes at least a part of fluorescence from the observation subject, to execute a process including: changing a region in which the observation sample is irradiated with light to a first region; arranging the first mirror unit on the optical axis; irradiating the observation sample with the autofocus detection light; capturing the observation sample irradiated with the autofocus detection light; calculating light intensity in a predetermined area in an image that has been obtained by capturing the observation sample; detecting, by driving the stage on which the observation sample is mounted in the direction parallel to the optical axis or by driving an objective lens that allows the observation subject to be observed in a direction parallel to the optical axis, a reference position in which the light intensity is the highest; adjusting, based on the reference position, a distance between the observation subject and the objective lens in the direction parallel to the optical axis; changing the region in which the observation sample is irradiated with light to a second region that is different from the first region; arranging the second mirror unit on the optical axis; irradiating the observation sample with the excitation light; and capturing the observation sample irradiated with the excitation light.

In some embodiments, a microscope system includes: a stage on which an observation sample is mounted, the observation sample including both a transparent member and an observation subject mounted on the transparent member; an objective lens that allows the observation subject to be observed; a driving unit configured to drive the stage or the objective lens in a direction parallel to an optical axis and to change a distance between the stage and the objective lens; a light source configured to selectively irradiate the observation sample with one of autofocus detection light that has a specific wavelength band and excitation light that excites the observation subject; a light shielding member that is inserted on and removed from the optical axis and that shields, when the light shielding member is arranged on the optical axis, at least a part of the autofocus detection light irradiated by the light source; an irradiation region changing unit configured to change a region in which the observation sample is irradiated with light; a first mirror unit that can be inserted on and removed from the optical axis, that reflects, toward the observation sample when the first mirror unit is arranged on the optical axis, at least a part of the autofocus detection light irradiated by the light source, and that passes at least a part of the autofocus detection light reflected by the observation sample; a second mirror unit that can be inserted on and removed from the optical axis, that reflects, toward the observation sample when the second mirror unit is arranged on the optical axis, at least a part of the excitation light irradiated by the light source, and that passes at least a part of fluorescence from the observation subject; a mirror arrangement unit configured to selectively arrange one of the first mirror unit and the second mirror unit on the optical axis; an imaging unit configured to capture the observation sample; and a controller configured to calculate a luminance center of gravity position in an image of the observation sample captured by the imaging unit and adjust, based on an amount of deviation of the luminance center of gravity position deviated from a reference position and based on a direction of the deviation, a distance between the observation subject and the objective lens in a direction parallel to the optical axis.

The above and other features, advantages and technical and industrial significance of this disclosure will be better understood by reading the following detailed description of presently preferred embodiments of the disclosure, when considered in connection with the accompanying drawings.

DETAILED DESCRIPTION

Preferred embodiments will be explained with reference to accompanying drawings.

First Embodiment

Figure 1:
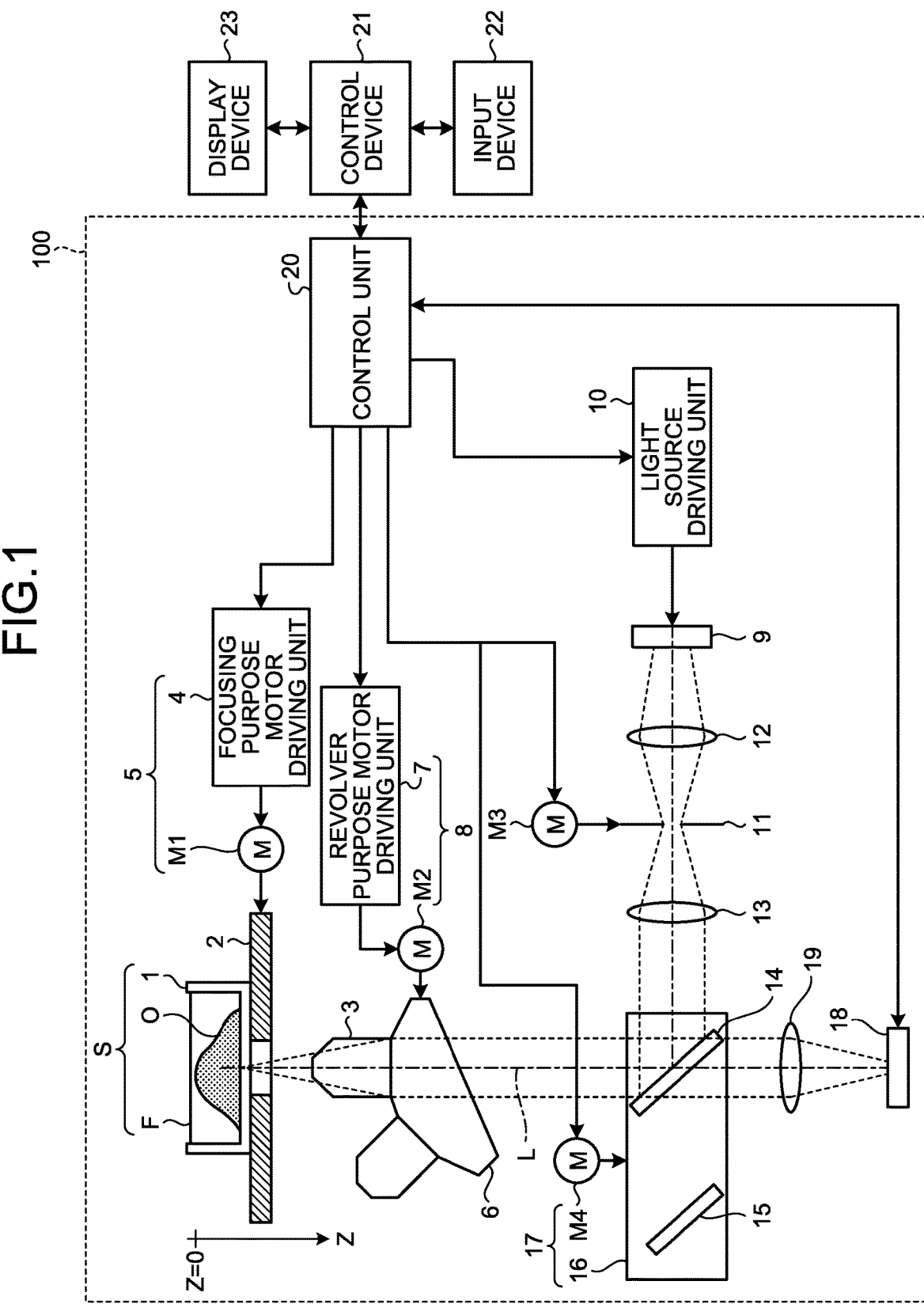
FIG. 1 is a schematic diagram illustrating the overall configuration of a microscope system according to a first embodiment.

FIG. 1 is a schematic diagram illustrating the overall configuration of a microscope system according to a first embodiment. As illustrated in FIG. 1, a microscope system 100 according to the first embodiment includes an optical system and optical elements used in a commonly used incident-light fluorescence microscope. Specifically, the microscope system 100 includes a transparent member 1; a stage 2 on which an observation sample S that includes both the transparent member 1 and an observation subject O mounted on the transparent member 1 is mounted; an objective lens 3 that allows the observation subject O to be observed; a focusing purpose driving unit 5 that includes both a focusing purpose motor driving unit 4 and a motor M1, that drives the stage 2 in the direction parallel to an optical axis L, and that changes the distance between the stage 2 and the objective lens 3; a revolver 6 that holds a plurality of objective lenses 3; a revolver purpose driving unit 8 that includes both a revolver purpose motor driving unit 7 a motor M2 and that selectively arranges one of the plurality of the objective lenses 3 on the optical axis L; a light source unit 9 that selectively irradiates the observation sample S with one of autofocus (hereinafter, also referred to as AF) detection light that has a specific wavelength band and excitation light that excites the observation subject O; a light source driving unit 10 that controls the light source unit 9; a field stop 11 that functions as an irradiation region changing unit for changing a region in which the observation sample S is irradiated with light; a collector lens 12 that condenses light substantially at the center of the field stop 11; a relay optical system 13 that converts the light that has passed through the field stop 11 to substantially collimated light; a first mirror unit that has a half mirror 14; a second mirror unit that has a dichroic mirror 15; a mirror holding unit 16 that holds the first mirror unit and the second mirror unit; a mirror arrangement unit 17 that selectively arranges one of the first mirror unit and the second mirror unit on the optical axis L; an imaging unit 18 that captures the observation sample S; a tube lens 19 that condenses light on the imaged surface of the imaging unit 18; and a control unit 20 that controls the focusing purpose motor driving unit 4, the revolver purpose motor driving unit 7, the light source driving unit 10, and the like.

A control device 21 that performs overall control of each of the components and that performs image processing on an observation image captured by the microscope system 100 is connected to the microscope system 100. Both an input device 22 that receives an operation input performed by an operator and a display device 23 that displays the observation image are connected to the control device 21.

The transparent member 1 is, for example, a glass bottom dish with cover glass on its bottom surface; however, any container may be used as a dish as long as the dish whose bottom surface is formed of a transparent member, such as, glass or plastic, including a commonly used dish, a well plate, or the like. The observation subject O mounted on the transparent member 1 is mainly a biological sample or the like. The observation subject O may also be immersed in a culture fluid F.

A through-hole through which light from the light source unit 9 is allowed to be passed is provided on the stage 2. The stage 2 moves along the optical axis L by the focusing purpose driving unit 5. Consequently, a position Z on the stage 2 with respect to the objective lens 3 is changed.

Each of the objective lenses 3 is arranged below the stage 2 and condenses the light from the light source unit 9 onto the observation sample S. In contrast, each of the objective lenses 3 condenses light reflected at the observation sample S and forms an observation image of the observation sample S. The objective lenses 3 each having, for example, low magnification, such as the magnification of 1, 2, and 4, or high magnification, such as the magnification of 10, 20, and 40, are provided so as to be freely attached and removed. Furthermore, the objective lenses 3 are dry objective lenses but may also be immersion objective lenses.

The focusing purpose motor driving unit 4 drives the motor M1 based on the control of the control unit 20.

The revolver 6 selectively arranges, on the optical axis L, one of the plurality of the objective lenses 3 each having different magnification. The revolver 6 switches the objective lens 3 to be arranged on the optical axis L by the revolver purpose driving unit 8.

The revolver purpose motor driving unit 7 drives the motor M2 based on the control of the control unit 20.

The light source unit 9 selectively irradiates the observation sample S with one of AF detection light and excitation light each having a different wavelength band. The light source unit 9 is, for example, a mercury lamp. The wavelength of the AF detection light is, for example, a visible wavelength region and it is preferable to select the wavelength in which fading of the observation subject O does not occur. Furthermore, the light source unit 9 may also be a light emitting diode (LED) light source. If the light source unit 9 is the LED light source, the light source unit 9 can irradiate light having wide-band wavelength due to including a plurality of LED light sources having different wavelengths with each other or due to irradiating a fluorescence material with light. Furthermore, if a plurality of LED light sources is used as the light sources for incident-light fluorescence observation, the LED light source having the wavelength band in which fading of the observation subject O does not occur may also be used as the light source for AF detection light. In this case, there is no need to newly add a light source to be used for AF.

The field stop 11 is, for example, an iris stop constituted by a plurality of vane members (not illustrated) is constituted by being integrated with a stop opening and closing mechanism (not illustrated). The motor M3 is connected to the stop opening and closing mechanism and performs control of opening and stopping of the field stop 11 based on the control performed by the control unit 20. Consequently, the field stop 11 can continuously change the region in which light is continuously irradiated. Specifically, based on the control performed by the control unit 20, the stop opening and closing mechanism changes the region in which the observation sample S is irradiated with the AF detection light to a first region and changes the region in which the observation sample S is irradiated with the excitation light to a second region.

The first mirror unit includes a band-pass filter (not illustrated) that blocks the half mirror 14 and excitation light and that passes AF detection light. The half mirror 14 can be inserted on and removed from the optical axis L. When the half mirror 14 is arranged on the optical axis L, the half mirror 14 reflects the AF detection light irradiated by the light source unit 9 toward the observation sample S and passes the AF detection light reflected at the observation sample S. The half mirror 14 is a half mirror that passes, for example, 50% of incident light and that reflects, for example, 50% of the incident light. The half mirror 14 reflects 50% of AF detection light irradiated by the light source unit 9 toward the observation sample S and passes 50% of AF detection light reflected at the observation sample S. Furthermore, the operation of the half mirror 14 inserting on and removing from the optical axis L may also be automatically performed by the motor M4, but may also be manually performed.

The second mirror unit includes the dichroic mirror 15, an excitation filter (not illustrated) that selectively passes only excitation light, an absorption filter (not illustrated) that passes fluorescence and that absorbs excitation light, and the like. The dichroic mirror 15 can be inserted on and removed from the optical axis L. If the dichroic mirror 15 is arranged on the optical axis L, the dichroic mirror 15 reflects the excitation light irradiated by the light source unit 9 toward the observation sample S and passes the fluorescence from the observation subject O. However, if the dichroic mirror 15 is arrange on the optical axis L, the dichroic mirror 15 may reflect at least a part of the excitation light irradiated by the light source unit 9 toward the observation sample S and may pass at least a part of the fluorescence from the observation subject O. Furthermore, the operation of the dichroic mirror 15 inserting on and removing from the optical axis L may also be automatically performed by the motor M4, but may also be manually performed. Furthermore, as the second mirror unit, a plurality of mirror units may also be provided in a turret manner so as to handle predetermined excitation wavelengths and fluorescence wavelengths.

The motor M4 drives, based on the control performed by the control unit 20, the mirror holding unit 16, thereby selectively arranging one of the first mirror unit and the second mirror unit on the optical axis L.

The imaging unit 18 generates image data of the observation sample S by receiving light of an observation image formed by the tube lens 19 and performing photoelectric conversion and then outputs the image data to the control unit 20. The imaging unit 18 is constituted by using a charge coupled device (CCD), a complementary metal oxide semiconductor (CMOS), or the like.

The control unit 20 performs overall control of the operation of the microscope system 100 by giving an instruction associated with each of the units constituting the microscope system 100 or performing data transfer.

Figure 2:
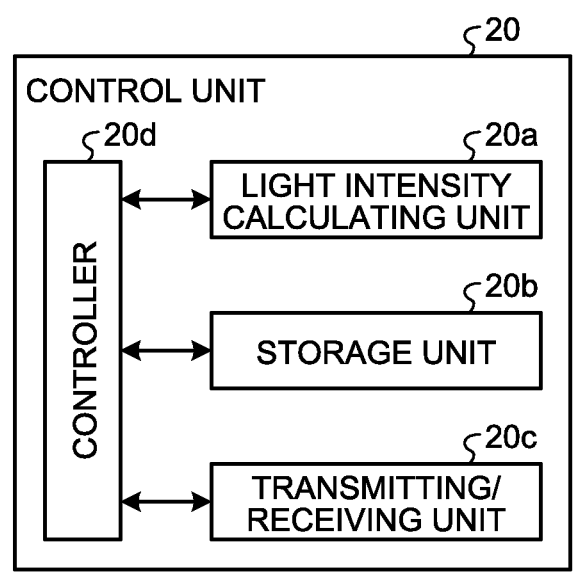
FIG. 2 is a block diagram illustrating a configuration of a control unit illustrated in FIG. 1.

FIG. 2 is a block diagram illustrating a configuration of a control unit illustrated in FIG. 1. As illustrated in FIG. 2, the control unit 20 includes a light intensity calculating unit 20a, a storage unit 20b, a transmitting/receiving unit 20c, and a controller 20d.

The light intensity calculating unit 20a calculates the light intensity in a predetermined area of the image obtained by capturing the observation sample S by the imaging unit 18. The light intensity calculating unit 20a is constituted by using a central processing unit (CPU), or the like.

The storage unit 20b is constituted by using a flash memory, a dynamic random access memory (DRAM), or the like. The storage unit 20b records data including various parameters needed for the operation of the control device 21. Furthermore, the storage unit 20b stores therein images captured by the imaging unit 18.

The transmitting/receiving unit 20c sends and receives, under the control of the controller 20d, a signal to and from the control device 21 or each of the components included in the microscope system 100.

The controller 20d is constituted by using a CPU or the like and performs overall control of each of the components included in the microscope system 100. Furthermore, by controlling the focusing purpose driving unit 5, the controller 20d detects a reference position in which the light intensity is the highest and adjusts, based on the reference position, the distance between the observation subject O and the objective lens 3 in the direction parallel to the optical axis L. The controller 20d may also be constituted by using a CPU or the like common to the light intensity calculating unit 20a.

The control device 21 can be constituted by combining, for example, a general-purpose device, such as a personal computer or a work station, into a general-purpose digital camera via an external interface. The control device 21 performs overall control of the microscope system 100, the input device 22, and the display device 23.

The input device 22 receives an input of each of various operations and outputs the received operation to the control device 21. The input device 22 is constituted by using a mouse, a keyboard, a button, a switch, a touch panel, and the like.

The display device 23 displays, under the control of the control device 21, an observation image that is based on the video signal processed in the control device 21 and various kinds of information related to the microscope system 100. The display device 23 is constituted by using a liquid crystal panel, an organic electro luminescence (EL) panel, or the like.

Figure 3:
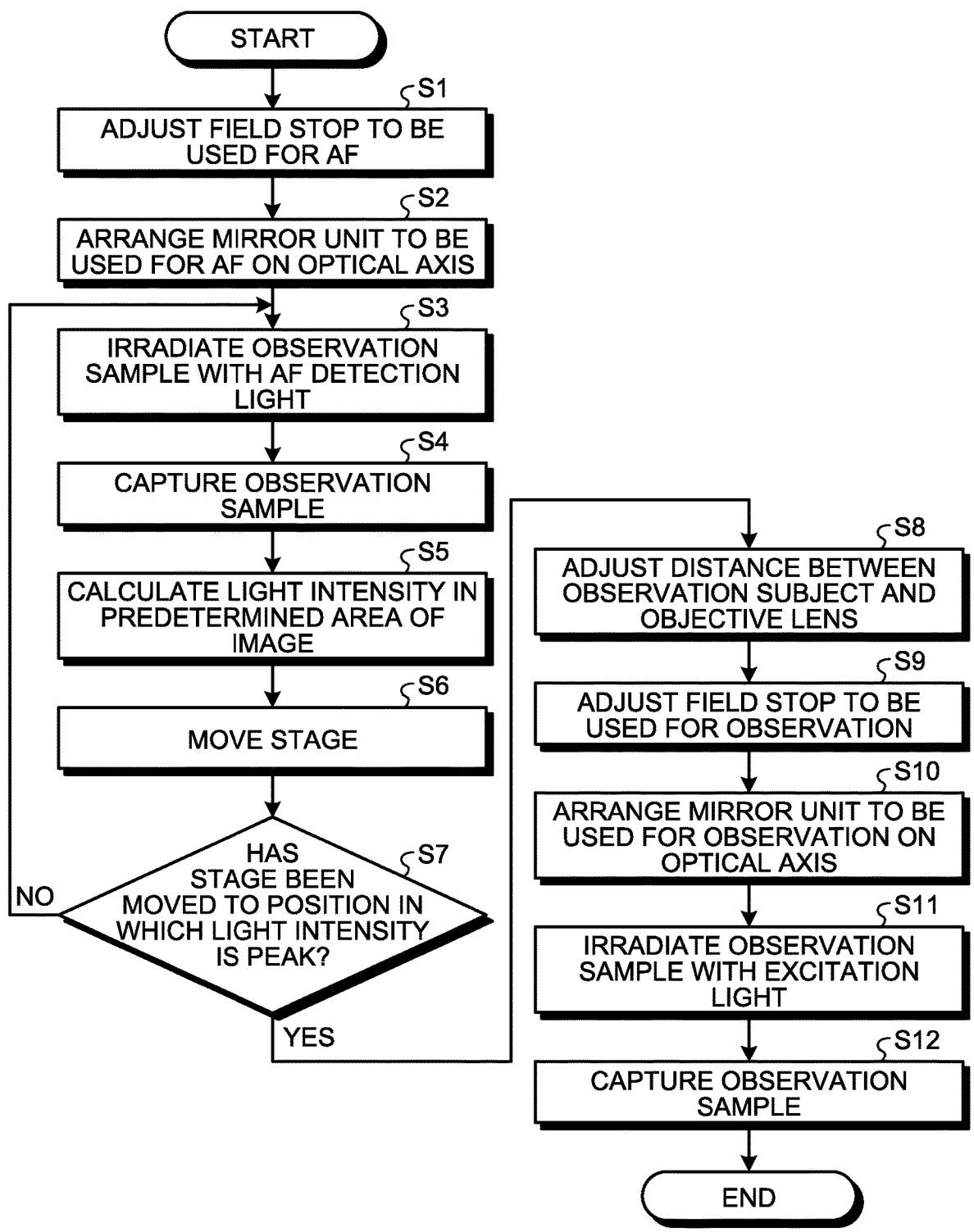
FIG. 3 is a flowchart illustrating an outline of a process performed by the microscope system according to the first embodiment.

In the following, an operation of automatically adjusting the focus performed by the microscope system 100 will be described. FIG. 3 is a flowchart illustrating the outline of a process performed by the microscope system according to the first embodiment. As illustrated in FIG. 3, the field stop 11 changes the region in which the observation sample S is irradiated with light to the first region. Specifically, the focusing purpose driving unit 5 adjusts, based on the control performed by the controller 20d, the stop diameter of the field stop 11 that is an iris stop to the stop diameter used for AF (Step S1: a first irradiation region changing step).

Subsequently, the mirror arrangement unit 17 arranges the first mirror unit on the optical axis L. Specifically, the motor M4 in the mirror arrangement unit 17 drives the mirror holding unit 16 based on the control performed by the controller 20*d*, thereby arranging, on the optical axis L, the first mirror unit that is used for AF (Step S2: a first mirror switching step).

Thereafter, the light source unit 9 irradiates, based on the control performed by the light source driving unit 10, the observation sample S with AF detection light (Step S3: a first light irradiation step). The AF detection light irradiated from the light source unit 9 is condensed by the collector lens 12. A part of the condensed light passes through the field stop 11 and is irradiated onto the observation sample S via the relay optical system 13, the half mirror 14, and the objective lens 3.

Then, the imaging unit 18 captures the observation sample S (Step S4: a first capturing step). Specifically, the imaging unit 18 acquires an image by performing photoelectric conversion on AF detection light that has been reflected at the observation sample S and that forms an image on an imaging surface of the imaging unit 18 by the tube lens 19 via the objective lens 3 and the half mirror 14. The image captured by the imaging unit 18 is appropriately stored in the storage unit 20*b*.

Figure 4:
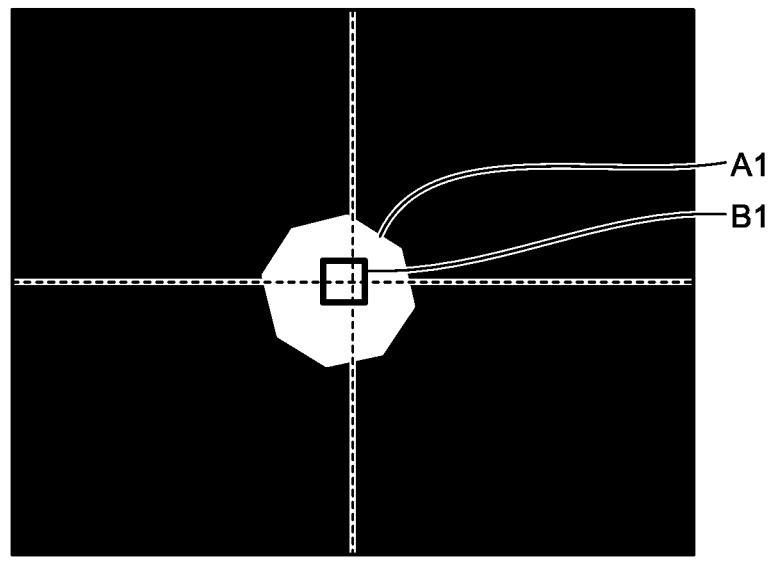
FIG. 4 is a diagram illustrating a state in which a predetermined area is set in an image.

Furthermore, the light intensity calculating unit 20*a* calculates the light intensity I in the predetermined area of the image of the observation sample S captured by the imaging unit 18 (Step S5: a light intensity calculation step). FIG. 4 is a diagram illustrating a state in which a predetermined area is set in an image. As illustrated in FIG. 4, the AF detection light is stopped down by the field stop 11 and only an area A1 that is a small part of the area is irradiated. Then, the light intensity calculating unit 20*a* sets a predetermined area B1 substantially at the center of the area A1. The light intensity calculating unit 20*a* calculates the light intensity of the area B1.

Subsequently, the focusing purpose driving unit 5 moves, based on the control performed by the controller 20*d*, the stage 2 in the Z direction parallel to the optical axis L by a predetermined amount (Step S6).

Figure 5:
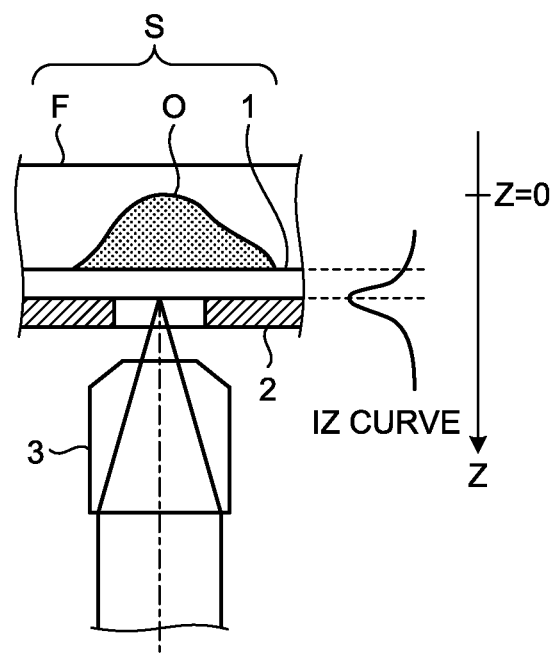
FIG. 5 is a diagram illustrating the positional relationship between the light intensity and a stage in a case where a dry objective lens is used.

Then, the controller 20*d* determines whether the stage 2 has been moved to the position (hereinafter, referred to as a reference position) in which the light intensity I is the maximum (Step S7). FIG. 5 is a diagram illustrating the positional relationship between the light intensity and a stage in a case where a dry objective lens is used. Regarding an IZ curve illustrated in FIG. 5, the horizontal axis represents the position Z of the stage 2 with respect to the objective lens 3 and the vertical axis represents the light intensity I. If the objective lens 3 is a dry objective lens, the light intensity I becomes the maximum when the focal point is focused onto the bottom surface of the transparent member 1. This is because a difference of a refractive index is the maximum on the boundary surface between the transparent member 1 and air and thus the light intensity of the reflected light is the highest.

If the controller 20*d* determines that the stage 2 has not moved to the reference position (No at Step S7), processes at Steps S3 to S6 are repeated.

In contrast, if the controller 20*d* determines that the stage 2 has been moved to the reference position (Yes at Step S7), the process proceeds to the subsequent step. Namely, the controller 20*d* detects the reference position by controlling the focusing purpose driving unit 5 (a detection step). As described above, the controller 20*d* compares, while sampling the light intensity I at the plurality of the positions Z, the light intensity I of the peak value that is previously stored with the calculated light intensity I and detects the reference position in which the light intensity I is the maximum. Furthermore, the controller 20*d* may also detects the reference position by using various known methods. For example, the controller 20*d* may also detect the reference position in which the light intensity I is the maximum by slightly moving the position Z of the stage 2 within the predetermined region.

Then, the controller 20*d* adjusts, based on the detected reference position, the distance between the observation subject O and the objective lens 3 in the direction parallel to the optical axis L (Step S8: an adjustment step). As illustrated in FIG. 5, at the reference position, the objective lens 3 is focused onto the bottom surface of the transparent member 1. Thus, at the reference position, although an error corresponding to an amount of the thickness of the transparent member 1 occurs, the objective lens 3 is substantially focused onto the observation subject O. Thereafter, by operating an operation handle, the operator needs to perform correction by finely adjusting the error corresponding to the amount of the thickness of the transparent member 1; however, because the objective lens 3 is substantially focused, the burden placed on the operator is greatly reduced.

However, by controlling the focusing purpose driving unit 5 and by moving the stage 2 in the direction parallel to the optical axis L from the reference position to a correction position that is away from a predetermined distance, the controller 20*d* may also adjust the distance between the observation subject O and the objective lens 3 in the direction parallel to the optical axis L. Specifically, the controller 20*d* may also move the stage 2 by an amount corresponding to the thickness of the transparent member 1 from the reference position to the lower part illustrated in FIG. 5 and adjust the focal point of the objective lens 3 to the observation subject O.

Then, the field stop 11 changes the region in which the observation sample S is irradiated with light to the second region. Specifically, the focusing purpose driving unit 5 adjusts, based on the control performed by the controller 20*d*, the stop diameter of the field stop 11 that is an iris stop to the stop diameter used for observation (Step S9: a second irradiation region changing step).

Subsequently, the mirror arrangement unit 17 arranges the second mirror unit on the optical axis L. Specifically, the motor M4 in the mirror arrangement unit 17 drives the mirror holding unit 16 based on the control performed by the controller 20*d*, thereby arranging the second mirror unit used for observation on the optical axis L (Step S10: a second mirror changing step).

Subsequently, the light source unit 9 irradiates the observation sample S with excitation light used for fluorescence observation (Step S11: a second light irradiation step). The excitation light irradiated by the light source unit 9 is condensed by the collector lens 12. A part of the condensed light passes through the field stop 11 and is irradiated onto the observation sample S via the relay optical system 13, the dichroic mirror 15, and the objective lens 3.

Then, the imaging unit 18 captures the observation sample S irradiated by the excitation light (Step S12: a second capturing step). Specifically, the imaging unit 18 acquires an image by performing photoelectric conversion on AF detection light that has been reflected at the observation sample S and that forms an image on an imaging surface of the imaging unit 18 by the tube lens 19 via the objective lens 3 and the dichroic mirror 15.

Consequently, the operation in which the microscope system 100 automatically adjusts the focus has been ended. Then, the operator can start fluorescence observation in an in-focus state.

With the microscope system 100, it is possible to automatically performing focusing and, furthermore, both of the light source unit 9 and the imaging unit 18 are commonly used for AF and fluorescence observation; therefore, there is no need to newly add a component and this prevents an increase in cost and size of the device. In particular, in a box type fluorescence microscope described above, by sharing the configuration used for fluorescence observation with AF, it is possible to prevent an increase in cost and size of the device, which are notable effects.

Second Embodiment

Figure 6:
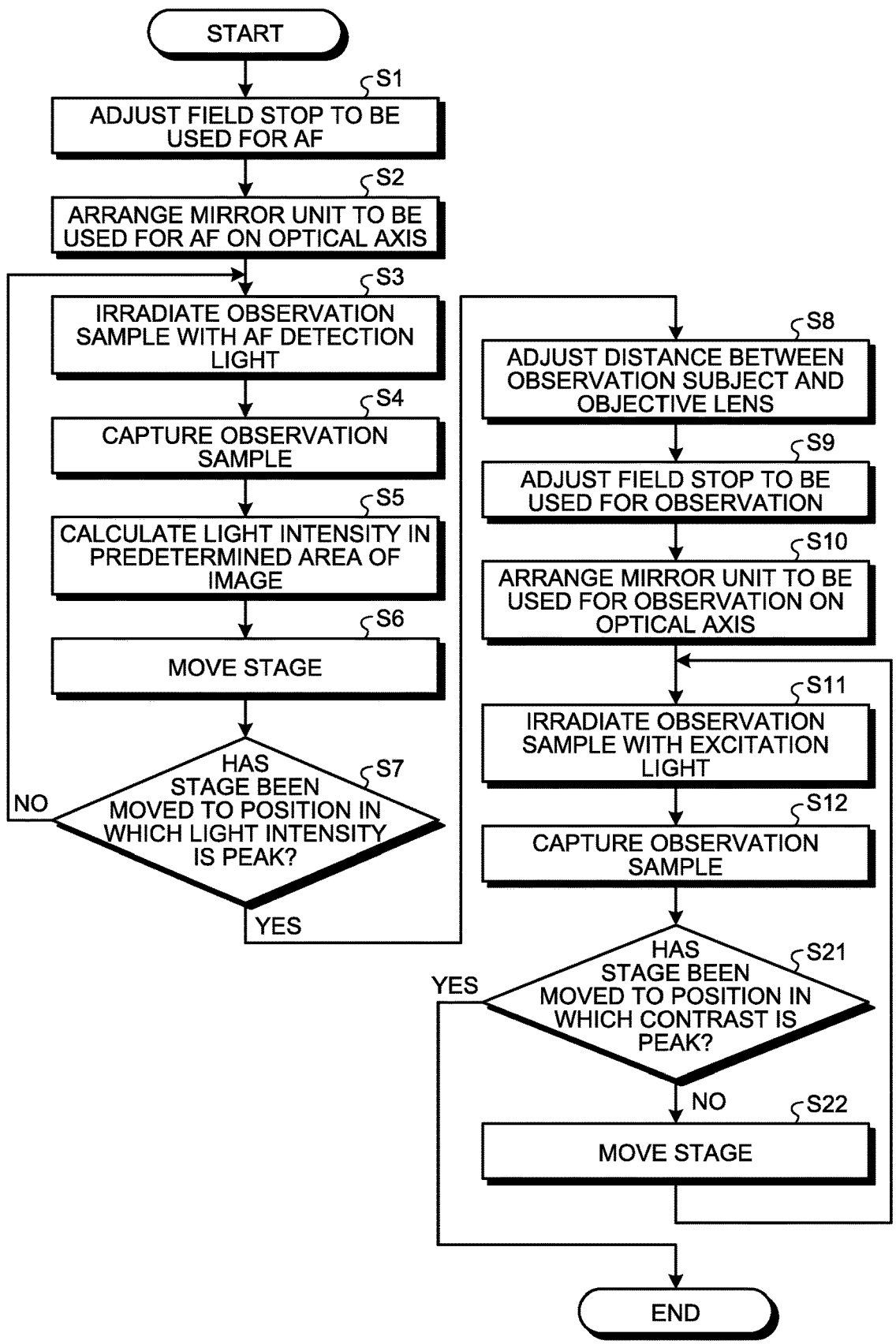
FIG. 6 is a flowchart illustrating an outline of a process performed by a microscope system according to a second embodiment.

The microscope system 100 according to a second embodiment has the same configuration as that described in the first embodiment and only the processes performed by the microscope system 100 are different. FIG. 6 is a flowchart illustrating an outline of a process performed by a microscope system according to a second embodiment. As illustrated in FIG. 6, up to the processes performed at Step S12, the same processes as that performed in the first embodiment are performed.

Thereafter, the controller 20*d* determines whether the stage 2 has been moved to the position in which the contrast of the captured image is the peak (Step S21). If the controller 20*d* determines that the stage 2 has not been moved to the position in which the contrast is the peak (No at Step S21), the controller 20*d* controls the focusing purpose driving unit 5 and moves the stage 2 in the Z direction parallel to the optical axis L by a predetermined amount (Step S22).

In contrast, if the controller 20*d* determines that the stage 2 has been moved to the position in which the contrast of the captured image is the peak (Yes at Step S21), a series of operations has been ended.

As described above, the controller 20*d* may also adjust, based on contrast information on the image of the observation sample S captured by the imaging unit 18, the distance between the observation subject O and the objective lens 3 in the direction parallel to the optical axis L. In other words, in addition to the function of performing active AF by using the light intensity at Steps S1 to S7, the microscope system 100 may also has a function of performing passive AF by using the contrast of the image at Steps S9 to S12. In this case, the microscope system 100 can more accurately performing focusing.

Figure 7:
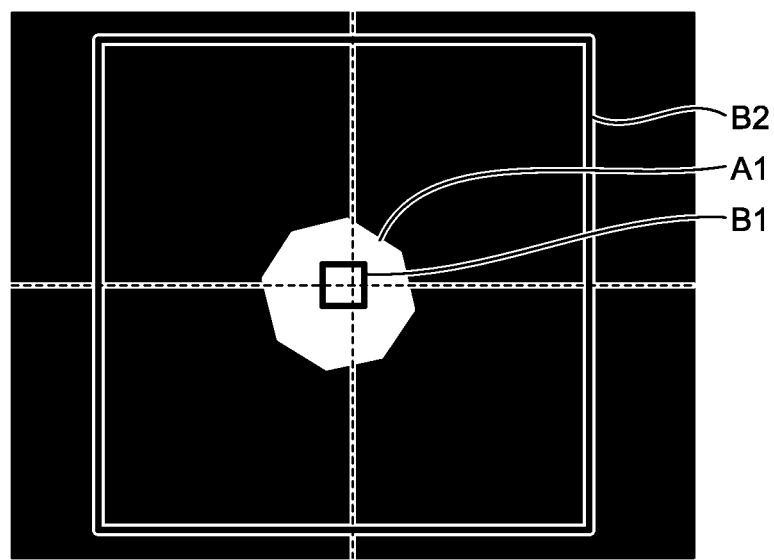
FIG. 7 is a diagram illustrating a state in which a predetermined area is set in an image.
Figure 8:
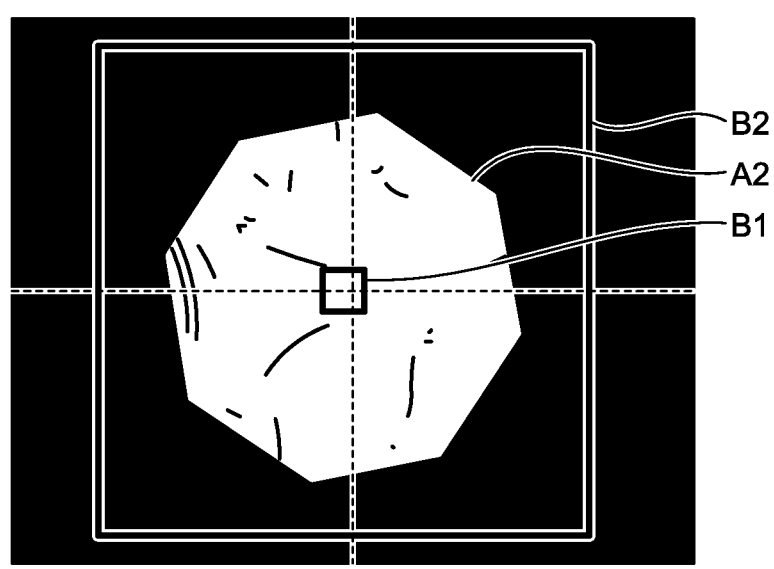
FIG. 8 is a diagram illustrating a state in which a predetermined area is set in an image.

Furthermore, in the embodiment described above, as illustrated in FIG. 4, a description has been given of the configuration in which the light intensity I of the area B1 included in the area A1 that is stopped down by the field stop 11; however, the configuration is not limited to this. FIG. 7 and FIG. 8 are diagrams each illustrating a state in which a predetermined area is set in an image. As illustrated in FIG. 7, it may also be possible to calculate the light intensity I of the area B2 that is a larger region that includes the area A1. Furthermore, as illustrated in FIG. 8, by increasing the diameter stopped down by the field stop 11, a further larger region of the area A2 can be irradiated with AF detection light. In this case, it may also be possible to calculate the light intensity I of a minute area B1 included in the area A2 or it may also be possible to calculate the light intensity I of the area B2 that is larger than the area A2.

Figure 9:
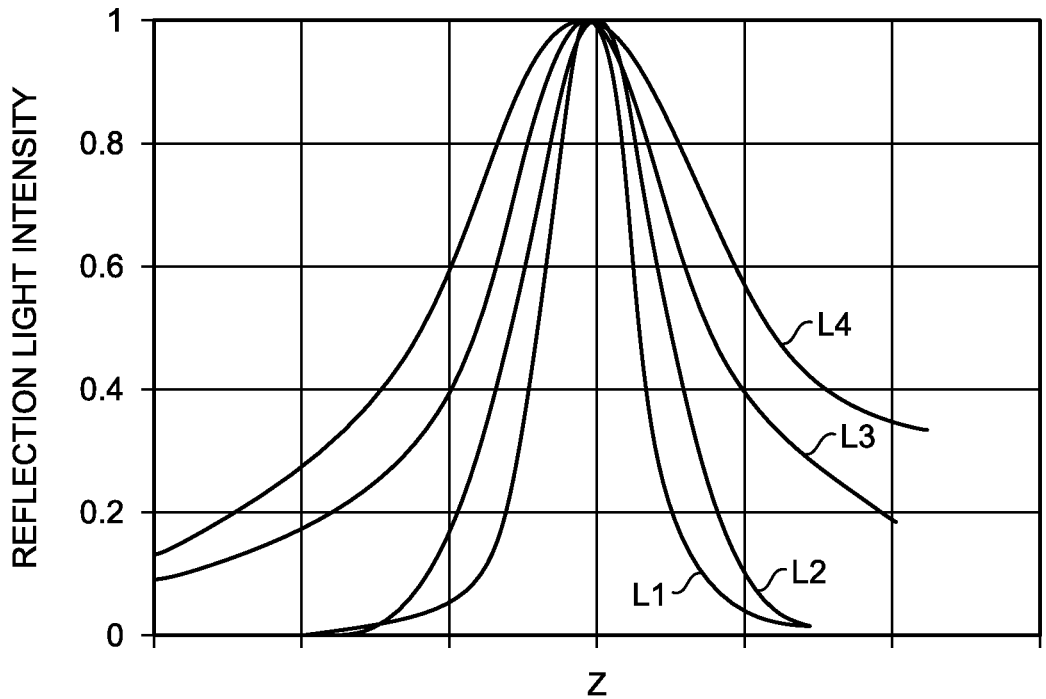
FIG. 9 is a diagram illustrating a normalized IZ curve in each setting.

FIG. 9 is a diagram illustrating a normalized IZ curve in each setting. In FIG. 9, a curved line L1 indicates the light intensity in the area B1 in a case where the area A1 is irradiated with AF detection light, a curved line L2 indicates the light intensity in the area B2 in a case where area A1 is irradiated with AF detection light, a curved line L3 indicates the light intensity in the area B1 in a case where the area A2 is irradiated with AF detection light, and a curved line L4 indicates the light intensity in the area B2 in a case where the area A2 is irradiated with AF detection light. The absolute values of the peak values are different in accordance with every setting; however, in FIG. 9, the light intensity is normalized such that the peak values are the same. As is clear from FIG. 9, the peak becomes sharp as the area irradiated with AF detection light by the field stop 11 is set to be small. Furthermore, the peak becomes sharp as the area in which the light intensity I is calculated is smaller. In this way, by changing an amount of stop reduced by the field stop 11 and the setting of the area in which the light intensity I is calculated, it is possible to change the sensitivity of AF. Accordingly, it may also use the configuration in which the focus is roughly adjusted with the setting indicated by the curved line L4 and the focus is precisely adjusted with the setting indicated by the curved line L1. With this configuration, by previously performing rough adjustment, it is possible to reduce the time needed to automatically adjust the focus. Furthermore, by also changing the diameter of an aperture stop (not illustrated), it is also possible to control the sharpness of the peak. Furthermore, the rising edge of the peak is gentle as the diameter of the aperture stop is set to be smaller.

Furthermore, in the embodiments described above, a description has been given of a case in which the area in which the light intensity I is to be calculated is a rectangle area; however, the shape is not limited to this. For example, the area for calculating the light intensity I may also be a circular shape.

Figure 10:
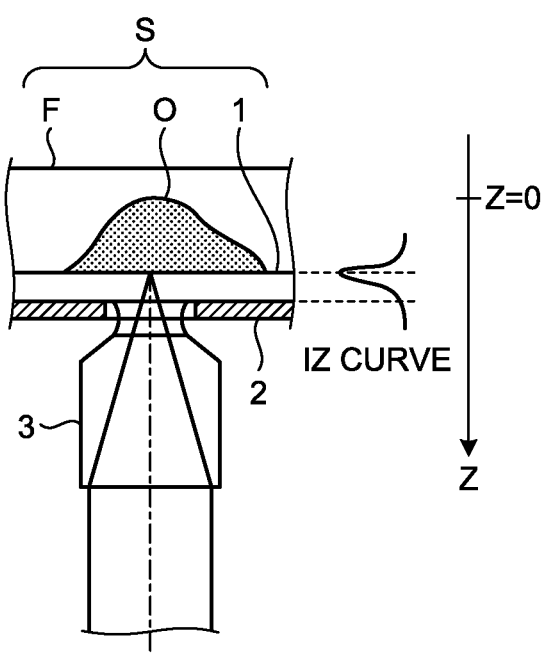
FIG. 10 is a diagram illustrating the positional relationship between the light intensity and a stage in a case where an immersion objective lens is used.

Furthermore, in the embodiments described above, a description has been given of a case in which the objective lens 3 is a dry objective lens; however, the objective lens 3 may also be an immersion objective lens. However, if an immersion objective lens is used, the reference position is different from the position described above. FIG. 10 is a diagram illustrating the positional relationship between the light intensity and a stage in a case where an immersion objective lens is used. Regarding the IZ curve illustrated in FIG. 10, similarly to FIG. 5, the horizontal axis represents the position Z of the stage 2 with respect to the objective lens 3 and the vertical axis represents the light intensity I. As illustrated in FIG. 10, if the objective lens 3 is an immersion objective lens, the light intensity I is the maximum when the focal point is focused onto the boundary surface between the transparent member 1 and the observation subject O. This is because, in a case of immersion, a difference of the refractive index is the maximum on the boundary surface between the transparent member 1 and the observation subject O and, accordingly, the light intensity of the reflected light is the highest. Furthermore, if the observation subject O is a biological sample, the refractive index is substantially the same as that of water.

Figure 11:
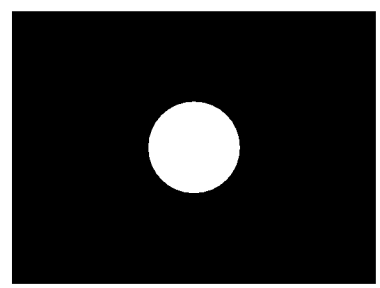
FIG. 11 is a diagram illustrating an example of the shape of light that has passed through a stop.
Figure 12:
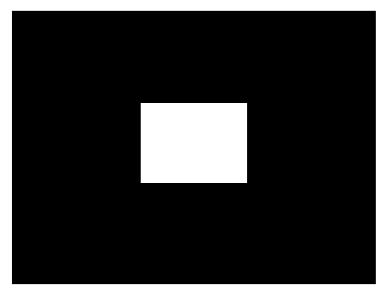
FIG. 12 is a diagram illustrating an example of the shape of light that has passed through the stop.
Figure 13:
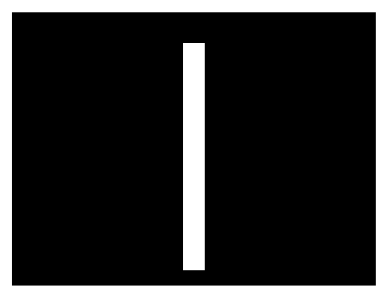
FIG. 13 is a diagram illustrating an example of the shape of light that has passed through the stop.
Figure 14:
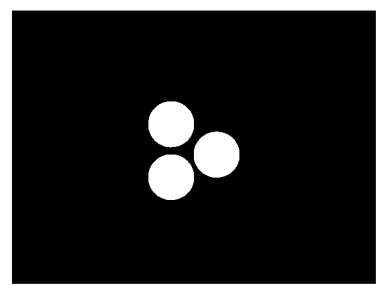
FIG. 14 is a diagram illustrating an example of the shape of light that has passed through the stop.

Furthermore, in the embodiments described above, a description has been given of a case in which the field stop 11 is an iris stop; however, the field stop 11 is not limited to this. The irradiation region changing unit may also be at least a single stop provided so as to be capable of being inserted in and removed from a substantially conjugate position with respect to the field stop. Specifically, when performing AF, another stop having a fixed diameter that is different from that of the field stop provided in the observation optical system is inserted in a substantially conjugate position with respect to the field stop in the observation optical system. Furthermore, the shape of the stop provided as the irradiation region changing unit is not particularly limited. FIGS. 11 to 14 are diagrams each illustrating an example of the shape of light that has passed through the stop. The shape of the stop may be a circular shape as illustrated in FIG. 11; however, the shape of the stop may also be a rectangular shape as illustrated in FIG. 12 or a linear shape as illustrated in FIG. 13. Furthermore, the stop may also be an arbitrary shape with a plurality of openings as illustrated in FIG. 14 as long as the IZ curve can be obtained from the shape. Namely, any shape may be used as long as a change in light intensity in the area used to calculate the light intensity is obtained from the shape Furthermore, in the embodiments described above, a description has been given of the configuration in which, because the controller 20d controls the focusing purpose driving unit 5, the stage 2 is allowed to be moved along the optical axis L; however, the configuration is not limited to this. The controller 20d controls the focusing purpose driving unit 5 and thus allows the objective lens 3 to be moved along the optical axis L, whereby the controller 20d may also adjust the distance between the observation subject O and the objective lens 3 in the direction parallel to the optical axis L.

Furthermore, at the time of AF, in the imaging unit 18, it may also be possible to perform a process of reducing an imaging region of an imager to a band shape or perform a binning process. Consequently, it is possible to reduce transfer time of images and calculation time of luminance, thereby shortening the overall processing time.

Third Embodiment

Figure 15:
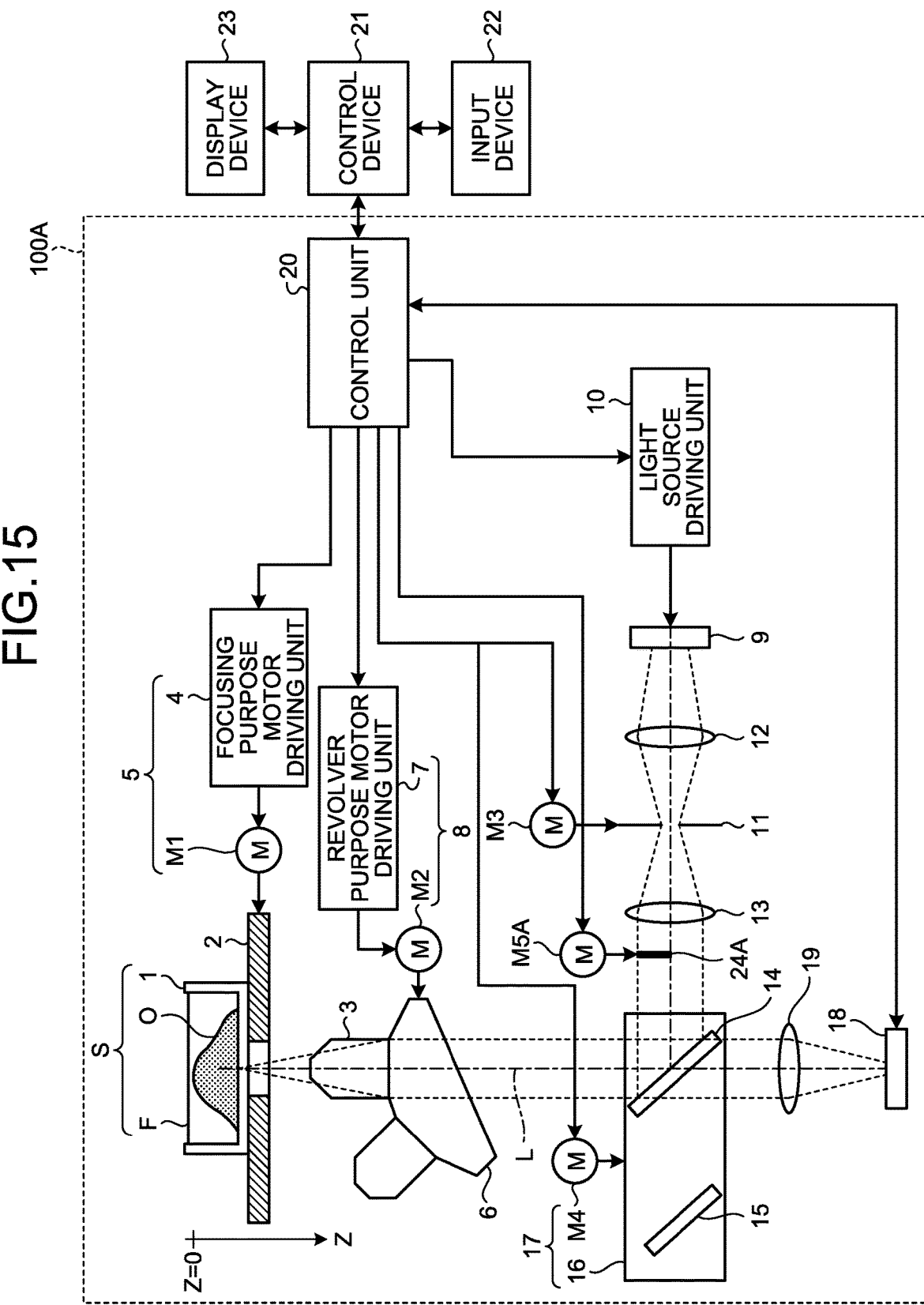
FIG. 15 is a schematic diagram illustrating the overall configuration of a microscope system according to a third embodiment.

FIG. 15 is a schematic diagram illustrating the overall configuration of a microscope system according to a third embodiment. As illustrated in FIG. 15, a microscope system 100A includes a pupil division stop 24A and a motor M5A that inserts and removes the pupil division stop 24A into and from an optical path.

The pupil division stop 24A can be inserted on and removed from the optical axis L and, when pupil division stop 24A is arranged on the optical axis L, the pupil division stop 24A shields at least a part of AF detection light irradiated by the light source unit 9. Specifically, the pupil division stop 24A is arranged at a conjugate position with respect to a pupil and shields substantially half of flux of light.

The control unit 20 calculates the luminance center of gravity position in the image of the observation sample S captured by the imaging unit 18 and adjusts, based on the calculated luminance center of gravity position, the distance between the observation subject O and the objective lens 3 in the direction parallel to the optical axis L.

Figure 16:
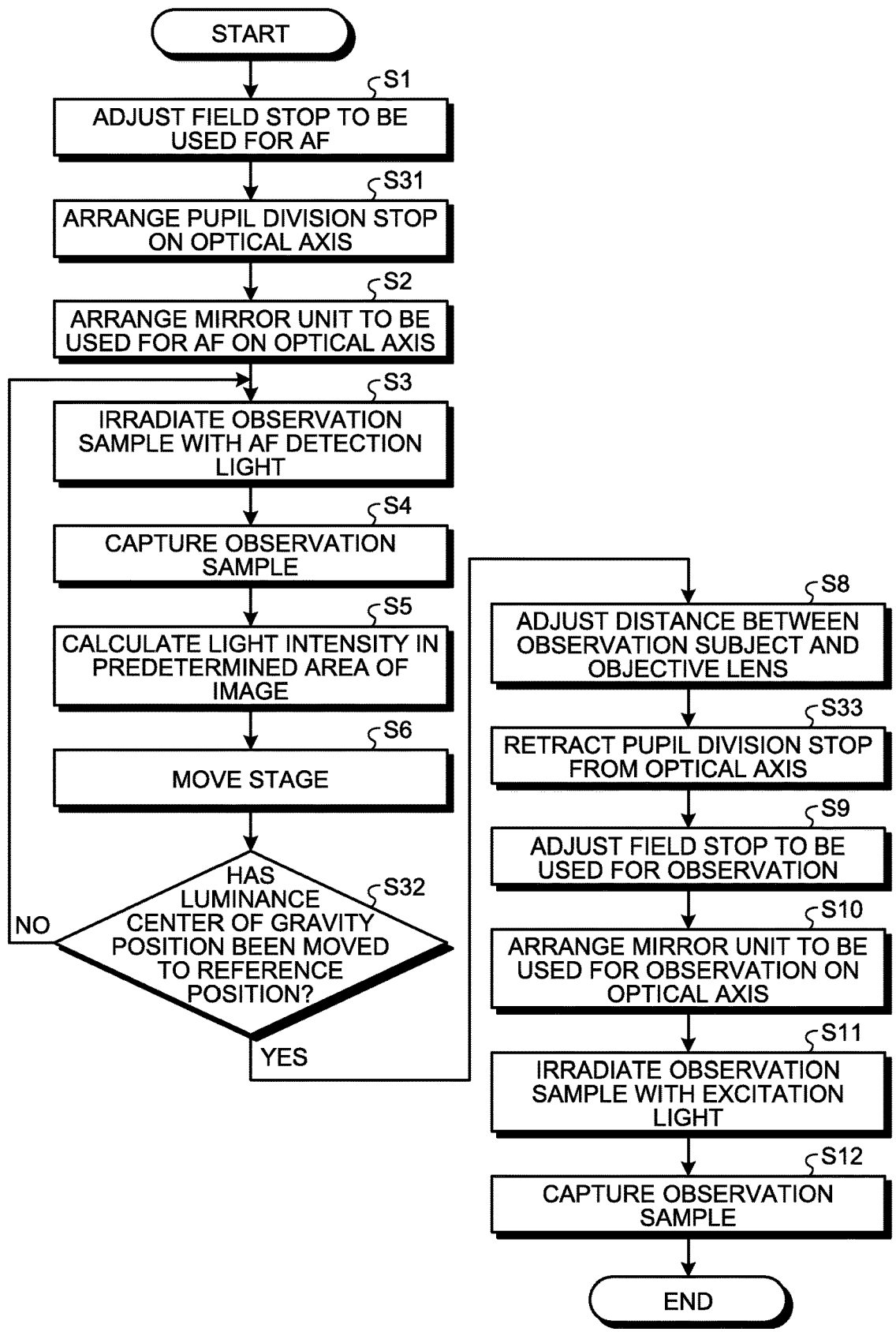
FIG. 16 is a flowchart illustrating the outline of a process performed by the microscope system according to the third embodiment.

FIG. 16 is a flowchart illustrating the outline of a process performed by the microscope system according to the third embodiment. As illustrated in FIG. 16, after having performed process at Step S1 similarly to the first embodiment, the pupil division stop 24A is arranged on the optical axis L (Step S31). Specifically, the motor M5A arranges, based on the control performed by the controller 20d, the pupil division stop 24A on the optical axis L.

Thereafter, similarly to the first embodiment, the processes at Steps S2 to S6 are performed.

Figure 17:
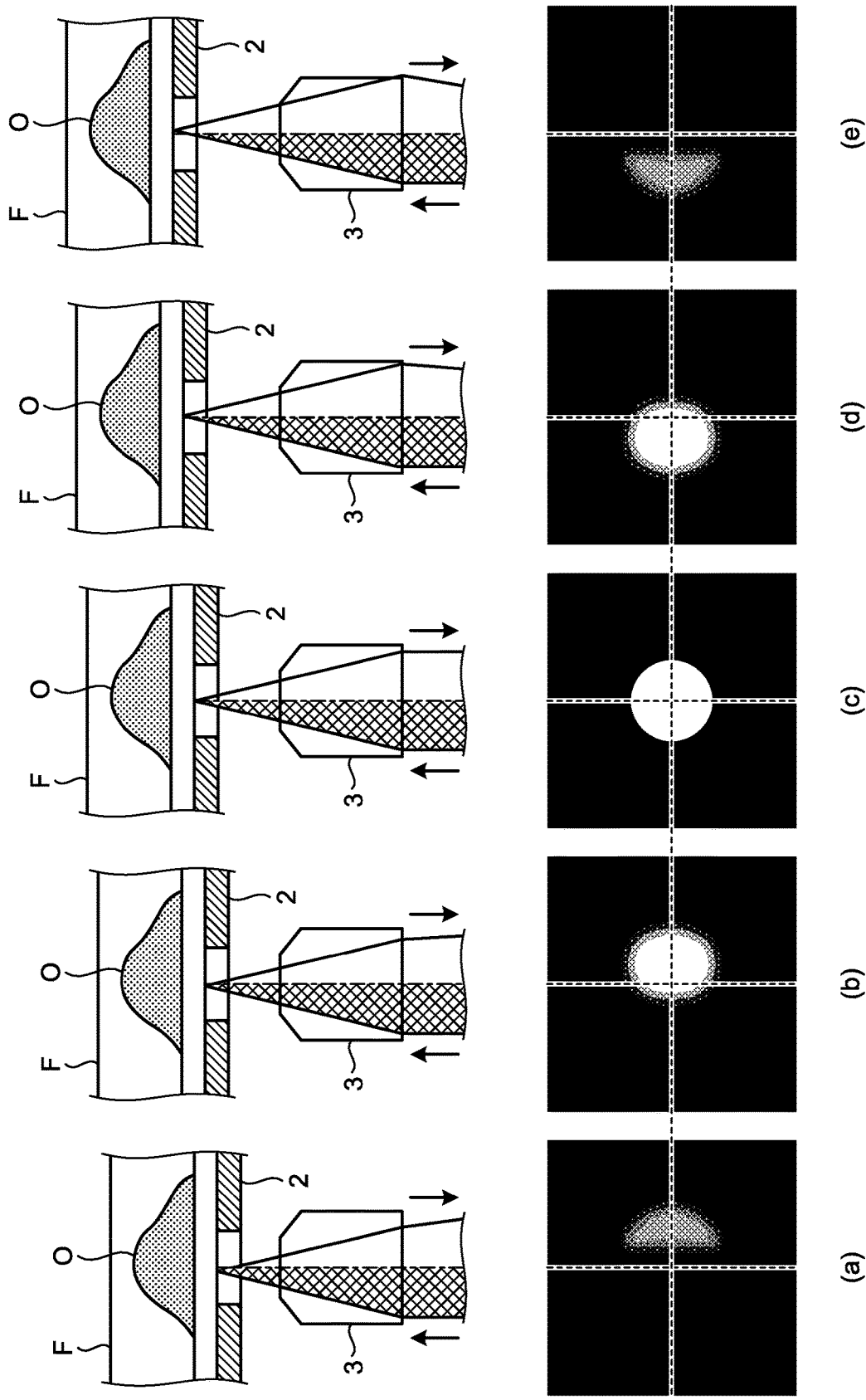
FIG. 17 is a diagram illustrating each of the positional relationships between luminance distributions in an image and the stage.

Then, the control unit 20 calculates the luminance center of gravity position of the image and determines whether the calculated luminance center of gravity position has been moved to the reference position (Step S32). FIG. 17 is a diagram illustrating each of the positional relationships between luminance distributions in an image and the stage. As illustrated in FIG. 17, because half of the pupil is shielded by the pupil division stop 24A, if the position Z on the stage 2 is deviated from the focal position, the luminance center of gravity position in the image is deviated from the reference position ((c) in FIG. 17). If the objective lens 3 is a dry objective lens, the luminance center of gravity position is matched with the reference position in a case where the focal point is focused onto the bottom surface of the transparent member 1. This is because a difference of refractive index between the transparent member 1 and air on the boundary surface is the highest and thus the light intensity of the reflected light is the highest. If the objective lens 3 is an immersion objective lens, similarly to the first embodiment, the reference position is the boundary surface between the transparent member 1 and the observation subject O. Accordingly, the control unit 20 can calculate the focal position based on an amount of deviation of the luminance center of gravity position deviated from the reference position and based on the direction of the deviation.

Figure 18:
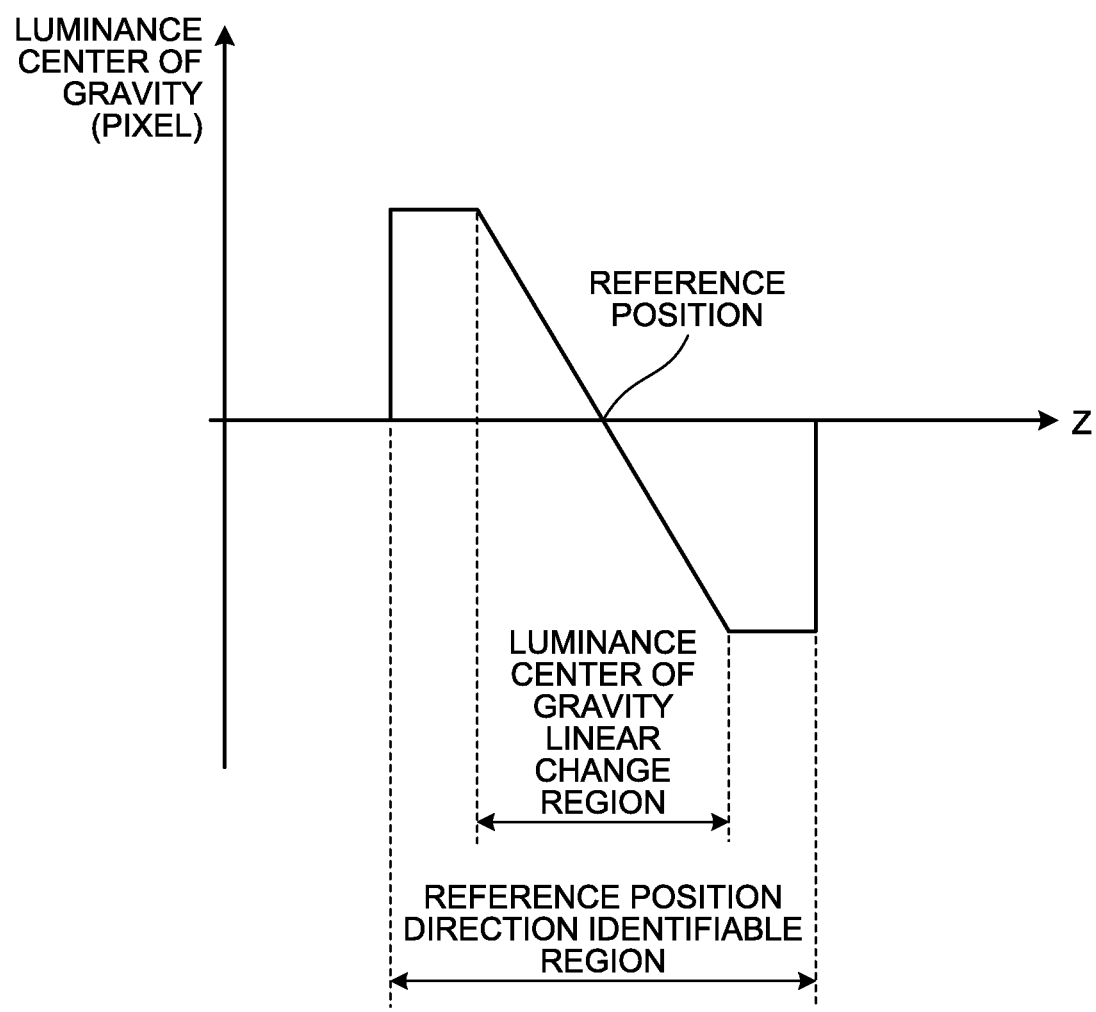
FIG. 18 is a graph illustrating a change in a position of the center of gravity of luminance with respect to the position of the stage.

FIG. 18 is a graph illustrating a change in a position of the center of gravity of luminance with respect to the position of the stage. As illustrated in FIG. 18, there are a luminance center of gravity linear change region in which the luminance center of gravity position is substantially linearly changed and a reference position direction identifiable region in which the luminance center of gravity position on an outer side is not changed but the direction of the reference position can be identified, both of which are symmetrical about reference position. The reference position direction identifiable region is in a state in which, seen from (a) or (e) illustrated in FIG. 17, the image is further blurred, the blurred image is spread over half of one side, and the luminance center of gravity position is converge to a certain value. Furthermore, on the outer side thereof, the luminance value is too low and thus the luminance center of gravity is not able to be accurately calculated due to being buried in noise. These characteristics can be designed to the intended characteristics based on the numerical aperture of the objective lens 3, the size of an imaging surface of the imaging unit 18, the sensitivity, the pixel pitch, and the size of the diameter of the field stop 11.

Thereafter, the same processes as those performed in the first embodiment are performed and, after the process at Step S8, the pupil division stop 24A is retracted from the optical axis L (Step S33). Specifically, the motor M5A retracts, based on the control performed by the controller 20d, the pupil division stop 24A from the optical axis L.

In the first embodiment, when a focal position is calculated, the position Z that is located on the stage 2 and in which the light intensity is the highest is searched. There are various known methods as a method of searching a peak position; however, it is unknown whether the peak is located on which side with respect to the current position; therefore, there is a need to search a peak after the stage is moved in a larger region or search a peak by repeatedly performing reciprocating movement (so-called a hill-climbing search method). In contrast, according to the third embodiment, it is possible to determine whether the focal position is located on which side with respect to the current position of the stage 2 based on an amount of deviation of the luminance center of gravity position deviated from the reference position and based on the direction of the deviation. Consequently, a useless search operation is unneeded and thus it is possible to detect the focal position at a high speed.

MODIFICATION

In addition to the pupil division stop 24A illustrated in FIG. 15, it may also be possible to further include a variable pupil stop that can change the stop diameter. Furthermore, based on the control performed by the controller 20d, it may also be possible to further include a variable pupil stop driving unit that changes the stop diameter of the variable pupil stop.

Figure 19:
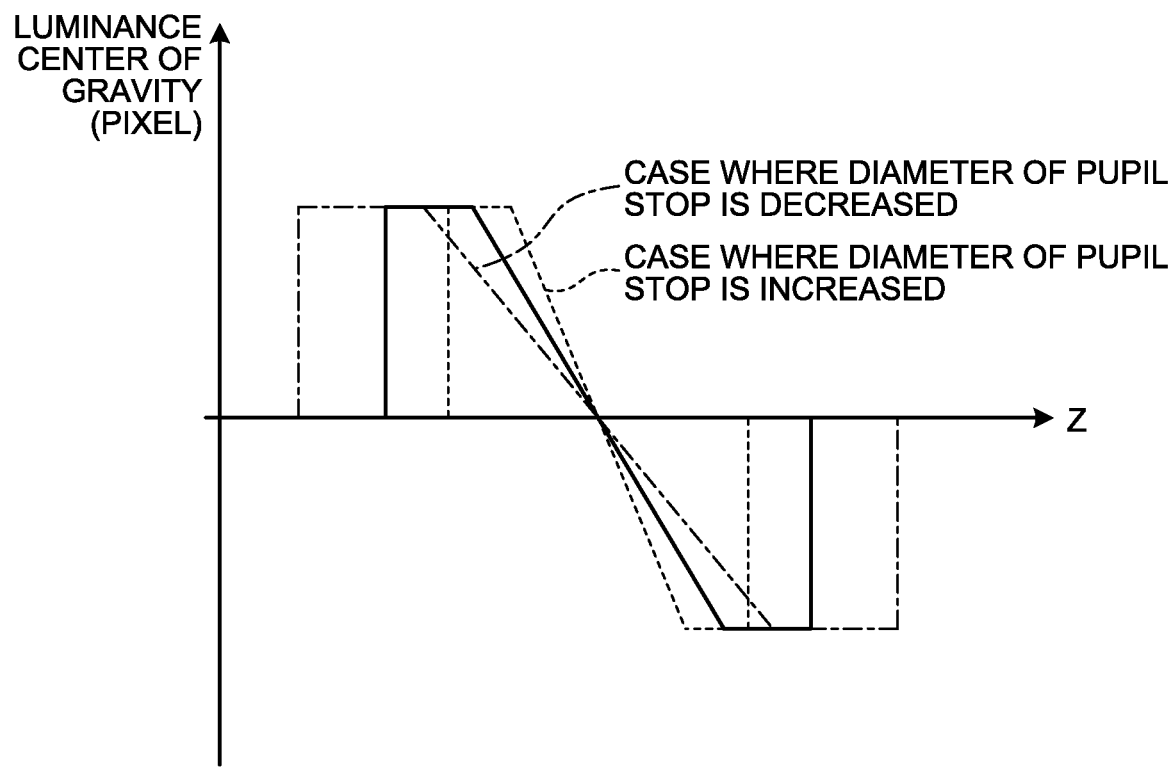
FIG. 19 is a diagram illustrating the relationship between the size of a pupil division stop and a position of the center of gravity of luminance.

FIG. 19 is a diagram illustrating the relationship between the size of a pupil division stop and a position of the center of gravity of luminance. As illustrated in FIG. 19, if the stop diameter of the variable pupil stop is increased, a change in the luminance center of gravity in the luminance center of gravity linear change region is increased and, consequently, it is possible to more accurately detect the reference position. In contrast, if the diameter of the pupil stop of the variable pupil stop is decreased, a change in the luminance center of gravity in the luminance center of gravity linear change region is decreased; however, both the luminance center of gravity linear change region and the reference position direction identifiable region are larger and it is possible to adjust the position Z on the stage 2 even from the location further away from the reference position. Namely, by gradually increasing the diameter of the pupil stop, it is possible to perform automatic adjustment of the focus at a high speed and with high accuracy.

Furthermore, similarly to the second embodiment, in addition to the function of performing active AF by using the luminance center of gravity, the microscope system 100A according to the third embodiment may also have a function of performing passive AF by using the contrast of an image. In this case, the microscope system 100A can more accurately performing focusing.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope system comprising:
   a stage on which an observation sample is mounted, the observation sample including both a transparent member and an observation subject mounted on the transparent member;
   an objective lens that allows the observation subject to be observed;
   a driving unit configured to drive the stage or the objective lens in a direction parallel to an optical axis to change a distance between the stage and the objective lens;
   a light source configured to selectively irradiate the observation sample with one of autofocus detection light that has a specific wavelength band and excitation light that excites the observation subject;
   an irradiation region changing unit configured to change a region in which the observation sample is irradiated with light;
   a first mirror unit that can be inserted on and removed from the optical axis, that reflects, toward the observation sample when the first mirror unit is arranged on the optical axis, at least a part of the autofocus detection light irradiated by the light source, and that passes at least a part of the autofocus detection light reflected by the observation sample;
   a second mirror unit that can be inserted on and removed from the optical axis, that reflects, toward the observation sample when the second mirror unit is arranged on the optical axis, at least a part of the excitation light irradiated by the light source, and that passes at least a part of fluorescence from the observation subject;
   a mirror arrangement unit configured to selectively arrange one of the first mirror unit and the second mirror unit on the optical axis;
   an imaging unit configured to capture the observation sample;
   a light intensity calculating unit configured to calculate light intensity in a predetermined area in an image of the observation sample captured by the imaging unit; and
   a controller configured to detect, by controlling the driving unit, a reference position in which the light intensity is the highest and adjust, based on the reference position, a distance between the observation subject and the objective lens in a direction parallel to the optical axis.

2. The microscope system according to claim 1, wherein the irradiation region changing unit is a field stop configured to change a region that is continuously irradiated with light.

3. The microscope system according to claim 1, wherein the irradiation region changing unit is at least a single stop provided so as to be capable of being inserted in and removed from a substantially conjugate position with respect to a field stop.

4. The microscope system according to claim 1, wherein the controller is configured to move, by controlling the driving unit, the stage or the objective lens to a correction position away from the reference position by a predetermined distance, in the direction parallel to the optical axis.

5. The microscope system according to claim 1, wherein the controller is configured to adjust, based on contrast information on the image of the observation sample captured by the imaging unit, the distance between the observation subject and the objective lens in the direction parallel to the optical axis.

6. The microscope system according to claim 1, wherein the objective lens is a dry objective lens, and
   the reference position is a boundary surface between the transparent member and air.

7. The microscope system according to claim 1, wherein the objective lens is an immersion objective lens, and
   the reference position is a boundary surface between the transparent member and the observation subject.

8. An observation method performed by a microscope system that includes
   a first mirror unit that can be inserted on and removed from an optical axis, that reflects, when the first mirror unit is arranged on the optical axis, at least a part of autofocus detection light having a specific wavelength band toward an observation sample that includes both a transparent member and an observation subject mounted on the transparent member, and that passes at least a part of the autofocus detection light reflected by the observation sample, and
   a second mirror unit that can be inserted on and removed from the optical axis, that reflects, when the second mirror unit is arranged on the optical axis, at least a part of excitation light that excites the observation subject toward the observation sample, and that passes at least a part of fluorescence from the observation subject, the observation method comprising:

changing a region in which the observation sample is irradiated with light to a first region;

arranging the first mirror unit on the optical axis;

irradiating the observation sample with the autofocus detection light;

capturing the observation sample irradiated with the autofocus detection light;

calculating light intensity in a predetermined area in an image that has been obtained by capturing the observation sample;

detecting, by driving the stage on which the observation sample is mounted in a direction parallel to the optical axis or by driving an objective lens that allows the observation subject to be observed in a direction parallel to the optical axis, a reference position in which the light intensity is the highest;

adjusting, based on the reference position, a distance between the observation subject and the objective lens in the direction parallel to the optical axis;

changing the region in which the observation sample is irradiated with light to a second region that is different from the first region;

arranging the second mirror unit on the optical axis;

irradiating the observation sample with the excitation light; and capturing the observation sample irradiated with the excitation light.

9. A non-transitory computer-readable recording medium having stored therein an executable program that causes a microscope system, which includes a first mirror unit that can be inserted on and removed from an optical axis, that reflects, when the first mirror unit is arranged on the optical axis, at least a part of autofocus detection light having a specific wavelength band toward an observation sample that includes both a transparent member and an observation subject mounted on the transparent member, and that passes at least a part of the autofocus detection light reflected by the observation sample, and a second mirror unit that can be inserted on and removed from the optical axis, that reflects, when the second mirror unit is arranged on the optical axis, at least a part of excitation light that excites the observation subject toward the observation sample, and that passes at least a part of fluorescence from the observation subject, to execute a process comprising:

changing a region in which the observation sample is irradiated with light to a first region;

arranging the first mirror unit on the optical axis;

irradiating the observation sample with the autofocus detection light;

capturing the observation sample irradiated with the autofocus detection light;

calculating light intensity in a predetermined area in an image that has been obtained by capturing the observation sample;

detecting, by driving the stage on which the observation sample is mounted in the direction parallel to the optical axis or by driving an objective lens that allows the observation subject to be observed in a direction parallel to the optical axis, a reference position in which the light intensity is the highest;

adjusting, based on the reference position, a distance between the observation subject and the objective lens in the direction parallel to the optical axis;

changing the region in which the observation sample is irradiated with light to a second region that is different from the first region;

arranging the second mirror unit on the optical axis;

irradiating the observation sample with the excitation light; and capturing the observation sample irradiated with the excitation light.

10. A microscope system comprising:

a stage on which an observation sample is mounted, the observation sample including both a transparent member and an observation subject mounted on the transparent member;

an objective lens that allows the observation subject to be observed;

a driving unit configured to drive the stage or the objective lens in a direction parallel to an optical axis and to change a distance between the stage and the objective lens;

a light source configured to selectively irradiate the observation sample with one of autofocus detection light that has a specific wavelength band and excitation light that excites the observation subject;

a light shielding member that is inserted on and removed from the optical axis and that shields, when the light shielding member is arranged on the optical axis, at least a part of the autofocus detection light irradiated by the light source;

an irradiation region changing unit configured to change a region in which the observation sample is irradiated with light;

a first mirror unit that can be inserted on and removed from the optical axis, that reflects, toward the observation sample when the first mirror unit is arranged on the optical axis, at least a part of the autofocus detection light irradiated by the light source, and that passes at least a part of the autofocus detection light reflected by the observation sample;

a second mirror unit that can be inserted on and removed from the optical axis, that reflects, toward the observation sample when the second mirror unit is arranged on the optical axis, at least a part of the excitation light irradiated by the light source, and that passes at least a part of fluorescence from the observation subject;

a mirror arrangement unit configured to selectively arrange one of the first mirror unit and the second mirror unit on the optical axis;

an imaging unit configured to capture the observation sample; and a controller configured to calculate a luminance center of gravity position in an image of the observation sample captured by the imaging unit and adjust, based on an amount of deviation of the luminance center of gravity position deviated from a reference position and based on a direction of the deviation, a distance between the observation subject and the objective lens in a direction parallel to the optical axis.

11. The microscope system according to claim 10, wherein the irradiation region changing unit is a field stop configured to change a region that is continuously irradiated with light.

12. The microscope system according to claim 10, wherein the irradiation region changing unit is at least a single stop provided so as to be capable of being inserted in and removed from a substantially conjugate position with respect to a field stop.

13. The microscope system according to claim 10, wherein the controller is configured to move, by controlling the driving unit, the stage or the objective lens to a correction position away from the reference position by a predetermined distance, in the direction parallel to the optical axis.

14. The microscope system according to claim 10, wherein the controller is configured to adjust, based on contrast information on the image of the observation sample captured by the imaging unit, the distance between the observation subject and the objective lens in the direction parallel to the optical axis.

15. The microscope system according to claim 10, wherein
- the objective lens is a dry objective lens, and
- the reference position is a boundary surface between the transparent member and air.

16. The microscope system according to claim 10, wherein
- the objective lens is an immersion objective lens, and
- the reference position is a boundary surface between the transparent member and the observation subject.

\* \* \* \* \*